(12) United States Patent
Trionfetti

(10) Patent No.: US 6,901,798 B2
(45) Date of Patent: Jun. 7, 2005

(54) BALANCING APPARATUS FOR ROTATING BODIES, IN PARTICULAR TOOL-CARRIERS WITH TOOLS ROTATING AT HIGH SPEED

(75) Inventor: Gianni Trionfetti, Agrate Brianza (IT)

(73) Assignee: Balance Systems S.p.A., Milan (IT)

( * ) Notice: Subject to any disclaimer, the term of this patent is extended or adjusted under 35 U.S.C. 154(b) by 0 days.

(21) Appl. No.: 10/721,366

(22) Filed: Nov. 26, 2003

(65) Prior Publication Data

US 2004/0115017 A1 Jun. 17, 2004

(30) Foreign Application Priority Data

Nov. 26, 2002 (IT) .................................... MI2002A2506

(51) Int. Cl.[7] ............................ G01M 1/16; F16F 15/10
(52) U.S. Cl. ......................... 73/462; 73/468; 74/573 R
(58) Field of Search ....................... 73/460, 462, 468, 73/469, 470, 459, 457, 458; 74/573 F, 572, 573 R

(56) References Cited

U.S. PATENT DOCUMENTS 3,861,025 A * 1/1975 Sims ........................... 29/593
5,676,025 A * 10/1997 Lulay ....................... 74/573 R
6,595,052 B2 * 7/2003 Wharton ...................... 73/460
6,634,255 B2 * 10/2003 Trionfetti .................. 74/573 F

* cited by examiner

Primary Examiner—Helen C. Kwok
(74) Attorney, Agent, or Firm—Browdy and Neimark, P.L.L.C.

(57) ABSTRACT

The apparatus (1) comprises at least two balancing rings (10) disposed in axial side by side relationship and coaxial with each other on the rotating body (13) to be balanced. The rings (10) are each unbalanced and rotatable with the rotating body (13), but can each be angularly rotated relative to the latter through positioning members. These members may comprise either a gear (29) that can be selectively engaged in rotation with peripheral toothings (28) of the rings (10) when the rotating body (13) is stopped, to bring the rings (10) to a relative angular position to which the situation of balance of the rotating body (13) corresponds, or locking elements to be selectively engaged with peripheral notches in the rings (10) to retain the rings (10) one by one while the rotating body (13) is rotated relative to the rings (10) through such an angle that the angular balance position is achieved.

16 Claims, 5 Drawing Sheets

BALANCING APPARATUS FOR ROTATING BODIES, IN PARTICULAR TOOL-CARRIERS WITH TOOLS ROTATING AT HIGH SPEED

FIELD OF THE INVENTION

The invention relates to a balancing apparatus for rotating bodies, in particular tool-carriers with tools rotating at high speed.

It is known that current machine tools are able to remove material at very high cutting speeds, even of 40,000 revolutions per minute and more. Under these rotation conditions balancing of the tool together with its tool-carrier mounted on the machine spindle acquires a fundamental importance.

DESCRIPTION OF THE PRIOR ART

In this connection apparatus are known which are capable of carrying out balancing directly on the machine, when unbalances of the tool exceeding a predetermined tolerance range are detected during working.

These apparatus substantially comprise two balancing rings, disposed in axial side by side relationship and coaxial with each other on a cylindrical support rigidly fixed to the rotating body to be balanced. The rings are rotatable together with the rotating body and each have a known unbalance in terms of intensity and angular position, generally equal in both of them.

These rings can be angularly rotated relative to the rotating body, during rotation of the latter, to such a position as to compensate, with the resultant of their unbalance, for the residual unbalance of the rotating body.

The relative angular rotation of the rings is controlled from the outside of the rotating body through a magnetic field for example, generated by electric windings located on a fixed part and associated with the rings at least along a peripheral portion of same. These windings create a rotating magnetic field, while the rings form the armature of the electromagnetic system and can be accelerated or slowed down with respect to the rotating body by varying the frequency of the rotating magnetic field with respect to the rotation frequency of the rotating body.

Each ring has a stator winding of its own and the windings can be operated independently of each other, and therefore they can be moved separately and in either way, to reach the exact balance position of the whole rotating structure more quickly.

There are also apparatus in which no windings are provided on the rotating part and for reaching the balance position, the rings are braked during calculated periods of time.

These balancing apparatus, due to the fact that on the rotating part neither motors nor electronic components are present and operation of the rings takes place without contacts, substantially have reduced sizes and allow a quick balancing during rotation of the bodies to be balanced, a tool/tool-carrier assembly for example that is mounted on the spindle of a machine tool.

The rings can be carried by respective bearings, being fastened to the external bearing crown, whereas the inner crown is fastened to the rotating body. It is however necessary that the rings be driven in rotation by the rotating body. A known solution contemplates the presence, for the purpose, of permanent magnets arranged on the rings and of pole plates disposed in side by side relationship with the rings and rigidly fixed to the rotating structure, so that the rings and rotating body are magnetically maintained in a situation of mutual stability under normal rotation conditions.

In this technical solution however, the balancing accuracy is limited because balancing is carried out for discrete angles depending on the pitch between the permanent magnets that cannot be reduced beyond predetermined limits. The solution itself has a relatively important bulkiness and in any case has strong limitations to miniaturization.

Other drawbacks of these apparatus in which the rings are operated electromagnetically are the following.

The presence of the electric windings may involve interferences in the individual control of the rings during the balancing step, because the magnetic field acting on one of the rings may affect the magnetic field acting on the other ring, so that achievement of the right angular balancing position of the rings is made more difficult. It is therefore necessary to keep some axial distance between the rings and between the respective windings, but a greater axial distance may lead to dynamic unbalances, because it can generate an undesirable torque in the axial plane of the rotating body due to the unbalanced rings being spaced apart too much.

Another drawback of these apparatus having an electromagnetic control resides in that they can magnetically attract metal scraps or chips or other ferrous materials removed during working, that will tend to accumulate in the regions where the magnetic field is present and to alter the magnetic field itself or form dangerous deposits, in particular at the air gap, which can stop the mechanisms and seriously jeopardize a good operation of the balancing apparatus.

At all events it is necessary to create a sealing protection for these apparatus at the regions where splashes of refrigerating liquids exist that could otherwise create electric short-circuits and damage the apparatus themselves.

In addition, these apparatus can be hardly applied to pre-existing machines.

To obviate these drawbacks U.S. Pat. No. 6,634,255 B2 of the sam Applicant discloses a balancing device in which for angular positioning of the balancing rings, stationary nozzles are provided that are externally associated with the rings and are adapted to send fluid jets, in particular compressed air jets, tangentially against the rings, so that the rings can be rotated relative to the rotating body.

The rings can be provided with projections in the form of fins or blades to improve the rotatory dragging action by the fluid jets.

Advantageously, for each of the rings two nozzles are provided that are disposed on opposite sides, to emit fluid jets acting on the rings in opposite ways, so that each of said rings can be rotated in opposite directions.

A selective control of the nozzles over preestablished times allows the rings to be rotated independently of each other, through any angular amounts, so as to obtain a great balancing accuracy, whereby the capacity of carrying out balancing without stopping the rotating body is maintained, and all drawbacks present in known apparatus in which the rings are operated electromagnetically are eliminated.

On the other hand, it has been found that in a practical application the working vibrations and sudden accelerations and decelerations of the rotating body can cause undesirable slow angular displacements of the rings and this may need some balancing corrections.

To avoid these displacements that can also take place in apparatus with an electromagnetic control of the rings, the rings should be mounted with more friction on the rotating body, but this would make the angular positioning of same more difficult and the balancing result less accurate.

In addition, the system for control of the compressed air through the nozzles can have some management difficulties and therefore can involve a more complicated control electronics.

SUMMARY OF THE INVENTION

Under this situation the present invention aims at producing an apparatus for automatic balancing of rotating bodies, in particular tool-carriers with tools rotating at high speed, capable of substantially obviating the drawbacks of the known art.

It is an important aim of the invention to provided an automatic balancing apparatus of the type involving rings, capable of carrying out, with a reduced bulkiness and reduced costs, an accurate balancing of rotating bodies, even of bodies adapted to rotate at very high speeds, in the order of 40,000–50,000 revolutions per minute.

It is a further important aim of the invention to provide an apparatus of the type in question enabling a calculated and controlled angular positioning of the balancing rings without limitations and also over very small portions, so as to obtain a very fine adjustment of the rings and therefore a great balancing accuracy.

Another aim of the invention is to provide an apparatus of the above kind, offering a higher balancing capability than known apparatus, without increasing the bulkiness of the apparatus.

A still further aim of the invention is to devise a balancing apparatus enabling the axial bulkiness of the balancing rings to be maintained to a minimum so as to avoid dynamic unbalances in the axial plane of the rotating body.

Another aim of the invention is to provide a balancing apparatus enabling the balancing rings to be acted upon without mutual interference, even in the case of very close rings.

Yet another aim of the invention is to devise a balancing apparatus adapted to operate also in the presence of refrigerating liquids and chips or other materials or working scraps, without this presence bringing to malfunctions of the apparatus.

Another aim of the invention is to provide an apparatus that can be easily applied to machine tools already in use.

A further by no means last aim of the invention is to provide an apparatus of the kind specified that is also adapted to machine tools or work centers provided with a great number of tools, even different from each other.

The foregoing and further aims that will become more apparent from the following description are substantially achieved by a balancing apparatus for rotating bodies, comprising means for rotatably supporting a rotating body, at least two balancing rings disposed on said rotating body in axial side by side relationship with each other and coaxial with said rotating body, said rings being each unbalanced and rotatable with said rotating body and further susceptible of assuming different angular positions relative to said rotating body, detecting means for detecting unbalance of said rotating body and for detecting said angular positions of said rings relative to said rotating body, and positioning means operatively connected with, and responsive to, said detecting means for carrying out an angular rotation between said rings and said rotating body to bring said rings to a relative angular position corresponding to a balance state of said rotating body, wherein said positioning means comprises positioning members selectively engageable with said rings in a stopped position of said rotating body, and driving means for selectively causing a relative angular rotation of said rings and said rotating body during mutual engagement of said positioning members and said rings.

BRIEF DESCRIPTION OF THE DRAWINGS

Further features and advantages of the invention will be best understood from the following detailed description of some preferred embodiments of the invention, illustrated by way of non-limiting example in the accompanying drawings, in which.

DESCRIPTION OF THE PREFERRED EMBODIMENTS

Figure 1:
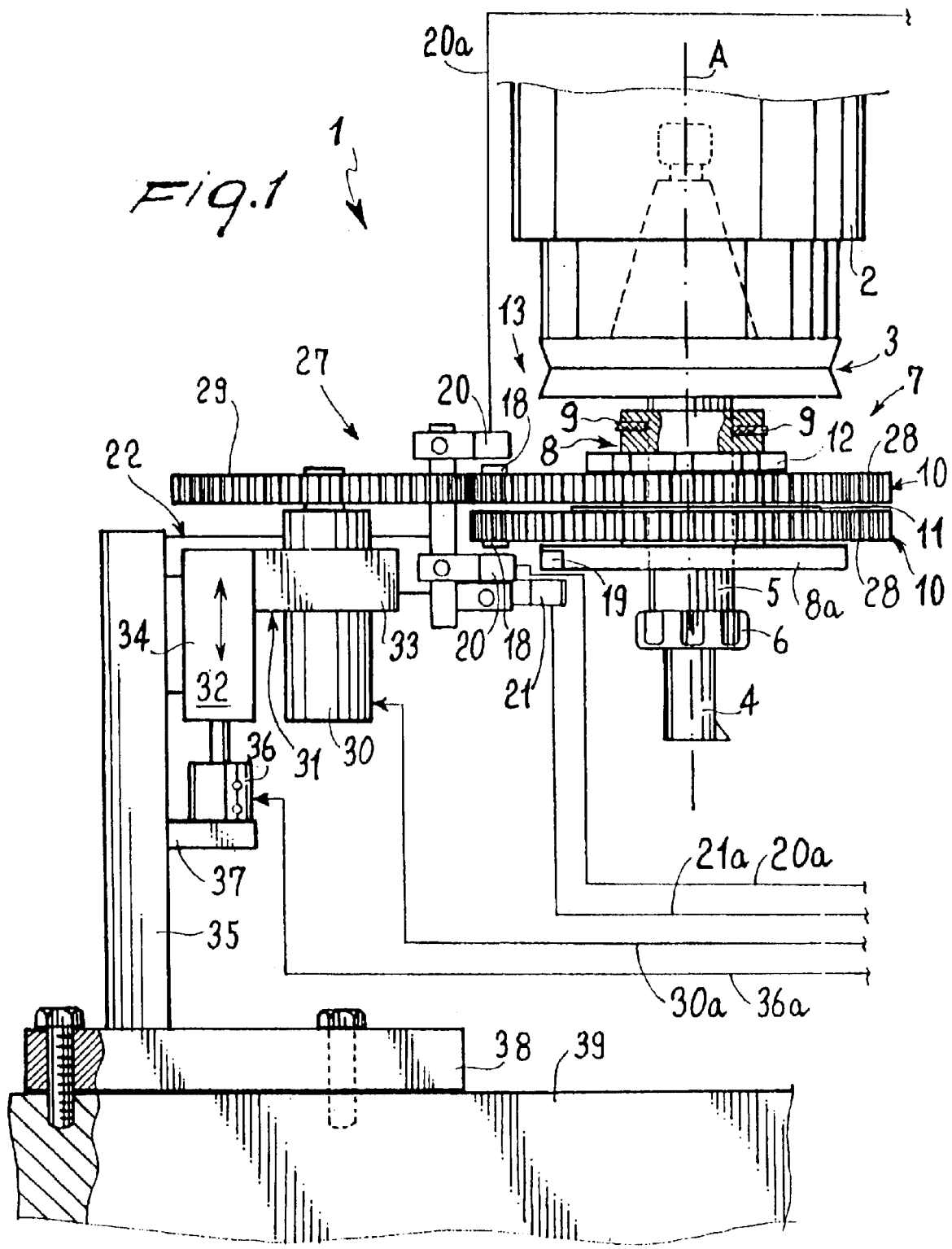
FIG. 1 is a partial diagrammatic side elevation view of a balancing apparatus in accordance with the invention in a first embodiment and applied to a machine tool, by way of example.

With reference to the drawings, a balancing apparatus for rotating bodies in accordance with the invention is generally identified by reference numeral 1. In the embodiments shown in FIGS. 1 to 4 it is applied, by way of example, to a work center such as a machine tool. Of this machine, shown in the drawings is a spindle 2 that through a tool-carrier 3 of known type carries a tool 4 fastened to the tool-carrier shaft 5 through a locking ring nut 6.

Mounted on shaft 5 is a balancing head, generally denoted at 7 and comprising a central hub 8 fastened to shaft 5 by locking dowels 9 for example and fixedly carrying an end flange 8a.

A pair of coaxial balancing rings 10 disposed in axial side by side relationship is disposed on hub 8 and an annular spacer 11 with a friction function is interposed therebetween.

Rings 10 are mounted on hub 8 by interposition of friction elements that are preloaded with Belleville washers, undulated springs or the like, not shown, so that rings 10 are made rigid in rotation with hub 8, and therefore with the shaft 5 of spindle 2 and with the tool-carrier 3, with a substantially high friction force. This usually involves rotation of rings 10 together with the tool-carrier 3, but the possibility of angularly rotating rings 10 with respect to the tool-carrier 3, selectively and temporarily, by applying to said rings a force capable of overcoming the set friction force. Said set friction force is of such a nature that it does not allow undesirable displacements during accelerations, decelerations and normal work rotation of the machine.

The assembly of rings 10 and friction elements is mounted on hub 8 by means of a locking ring nut 12 also carrying out friction preloading and adjustment, to be screwed down on a threaded portion of hub 8.

The spindle 2 and tool-carrier 3 with the elements borne by the latter and the tool 4 constitute the rotating body 13 to be balanced by means of rings 10. This body 13 is rotatable about the rotation axis A.

Figure 5:
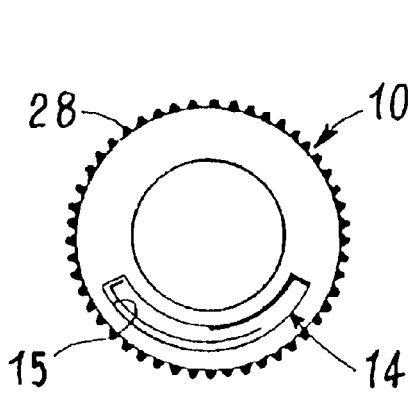
FIG. 5 shows a particular embodiment of the balancing rings, by way of example.
Figure 6:
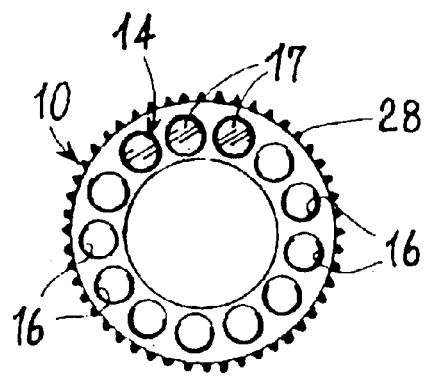
FIG. 6 shows another possible embodiment of the balancing rings.

Rings 10 have each an unbalance region 14, consisting of one or more millings, cavities or apertures 15, as shown in FIG. 5, or of one or more threaded holes 16 distributed along an inner circumference, in which gauged masses 17 of a specific weight different from that of the material of rings 10 are screwed down, as shown in FIG. 6. Thus region 14 on each ring 10 creates an unbalance of known value and angular position.

By virtue of the fact that the rings 10 are not perfectly balanced, but have known unbalance regions 14, and of the fact that they can be angularly rotated with respect to the rotating body 13, by an appropriate relative angular position of rings 10 relative to body 13 it is possible to create a resultant unbalance of rings 10 compensating for the residual unbalance of the rotating body 13.

It is to be noted that the individual elements composing body 13 have been already individually balanced during the construction step, but once they have been mounted to form this body, residual coupling unbalances may arise, between the tool-carrier 3 and tool 4 for example and/or between the tool-carrier 3 and spindle 2, to which possible residual unbalances of the components may add, so as to give origin to an overall residual unbalance. It is exactly this residual unbalance that is eliminated by the apparatus of the invention.

Each ring 10 has an angular reference notch or mark 18, such as a small magnet, a hole, a metal bulge or the like, disposed on the outer face of rings 10 at the periphery thereof. Likewise, flange 8a has an angular reference notch or mark 19 that can be a magnetic element too or the like and that constitutes the angular-zero reference enabling the angular position of the unbalance of the rotating body 13 to be determined as well as the angular position at which rings 10 are to be disposed for unbalance compensation.

Associated with notches 18 and 19 are respective angular-position sensors 20, 21, of known type, of the magnetic or optical type for example, carried by an outer support 22. Associated in known manner with spindle 2 is a vibration sensor or transducer (accelerometer) 23 (FIG. 2).

Sensors 20, 21 and 23, which in association with the notches 18 and 19 define detecting means for determining the unbalance of the rotating body 13 and for detecting the angular position of the balancing rings 10, are electrically connected, through respective electric connections 20a, 21a, 23a, to an electronic unit 24 for balancing control and operation of a type known by itself. Unit 24 is in turn interfaced with a machine control center 25 that in known manner controls the automatic working of the piece being machined. Also operatively connected with unit 24 is a motor 26 carrying out rotation of spindle 2.

For the angular rotation of rings 10 relative to the tool-carrier 3, positioning means 27 is provided which in accordance with the invention comprises positioning members to be selectively brought into engagement with rings 10 in the stopped position of the rotating body 13, and driving means adapted to carry out a relative angular rotation between the rings 10 and the rotating body 13 in the position of mutual engagement between said positioning members and said rings.

Figure 2:
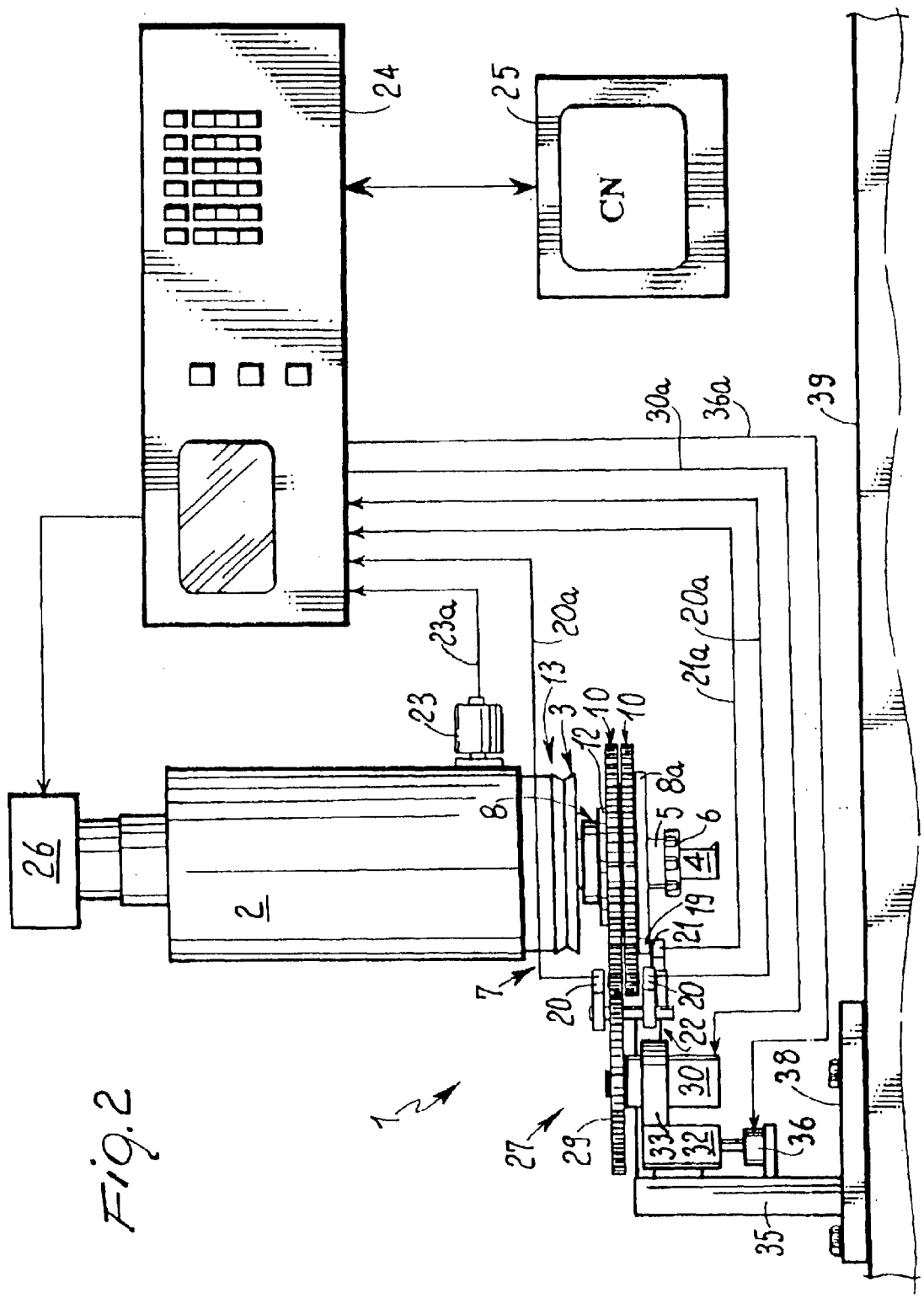
FIG. 2 is a partly diagrammatic overall view of the apparatus.

In accordance with a first embodiment of the invention shown in FIGS. 1 and 2, the positioning means 27 substantially comprises a geared system.

In more detail, each of the rings 10 is provided with a positioning toothing 28, a peripheral toothing for example, adapted to mesh with positioning members consisting of at least one positioning gear 29, driven in rotation by driving means comprising at least one servomotor 30 with a reduction gear, carried by a support structure 31 disposed alongside the rotating body 13.

Structure 31 preferably comprises a slide 32 supporting the servomotor 30 through an arm 33 and is slidable parallel to axis A of the rotating body 13. The slide 32 is guided on a guide 34 fastened to a post 35 of the outer support 22 and is operated by a pneumatic cylinder 36 for example, fastened to a bracket 37 projecting from post 35. Said post is rigidly connected to a support base 38 fastened to the machine table 39. As known, table 39 is shiftable transversely of the rotation axis A, so that gear 29 is shiftable, together with support 22, to a rest position at which it is disengaged from rings 10.

The servomotor 30 and pneumatic cylinder 36 are driven by the control and operation unit 24, being operatively connected thereto through respective electric connections 30a and 36a. Slide 32 is movable at least between a first position, in which the positioning gear 29 is flush with one of the rings 10 and can get in engagement with the toothing 28 thereof, and a second position, in which gear 29 is flush with the other ring 10 and can get in engagement with the toothing 28 of the last mentioned ring. In order to facilitate meshing, the teeth can be suitably rounded at the flat faces of rings 10.

It is to be noted that the position sensors 20 and 21 are disposed angularly offset with respect to the region concerned with the movement of the positioning gear 29, as is well apparent from the drawings.

Operation of the above described balancing apparatus is as follows.

By rotating body 13, the rings 10 that are at a neutral position, i.e. offset by 180° from each other so that the resultant of their unbalance is zero, rotate in synchronism with the body itself. Sensors 20, 21 and 23 transmit the respective data to the control and operation unit 24, which data comprises the angular positions of the two rings 10 relative to the angular zero defined by notch 19 rotatably rigid with the tool-carrier 3, and the course of the rotating body 13 vibrations.

Unit 24 processes all data and in known manner establishes the intensity and angular position of the unbalance in body 13. If the detected unbalance is out of tolerance, unit 24 determines the necessary correction to be done through the balancing rings 10, i.e. the relative angular position at which rings 10 are to be placed with respect to the rotating body 13 to enable them to create an unbalance of the same intensity as, and of opposite angular position with respect to, the unbalance detected by unit 24.

Unit 24 operates stopping of motor 26 and spindle 2 stops. The angular stop position of the rotating body 13 is automatically recognized through sensor 21. The balancing cycle is now activated, which cycle involves positioning of table 39 in the operating position of the positioning gear 29, i.e. in the position in engagement with one of rings 10, as shown in FIGS. 1 and 2.

Unit 24 then drives intervention of the positioning means 27 activating the servomotor 30 for rotating gear 29 and the relevant ring 10 in engagement therewith, with a torque capable of overcoming the ring friction until bringing the ring itself to the calculated relative angular position.

At this point activation of the pneumatic cylinder 36 is carried out and gear 29 is brought into engagement with the other ring 10 and carries out the angular rotation of same to position it to the relative angular position calculated for such a ring by the control and operation unit 24.

When positioning of rings 10 has been completed, unit 24 drives withdrawal of the positioning means 27 to the disengaged rest position and starts the balancing verification cycle.

If the now determined unbalance is within the tolerance, the machine is ready for working, otherwise a further balancing cycle is carried out and the position of the rings 10 is corrected until the required balance state of the rotating body 13 is achieved.

It should be noted that rings 10 can be selectively rotated in either way towards the balance position, to reach the balance position of the system more quickly. In the embodiment shown in FIG. 3, rings 10 are devoid of the driving toothing and the positioning means 27 comprises positioning members in the form of locking means 40 adapted to temporarily and selectively keep rings 10 in a locked position, and driving means diagrammatically identified by 41, for angular rotation of the rotating body 13 to be activated when the locking means 40 engages rings 10.

More particularly, each of rings 10 has, at a predetermined angular position, a notch 42 preferably formed in the circumferential surface of the ring, in which a respective locking element 43 can be inserted. The locking elements 43 are mounted in superposed relationship adjacent to the respective rings 10, on a fixed table 44 rigidly connected to post 35 fastened to the machine table 39, and preferably consist of pistons movable in a radial direction relative to rings 10 through respective pneumatic cylinders 45.

Figure 3:
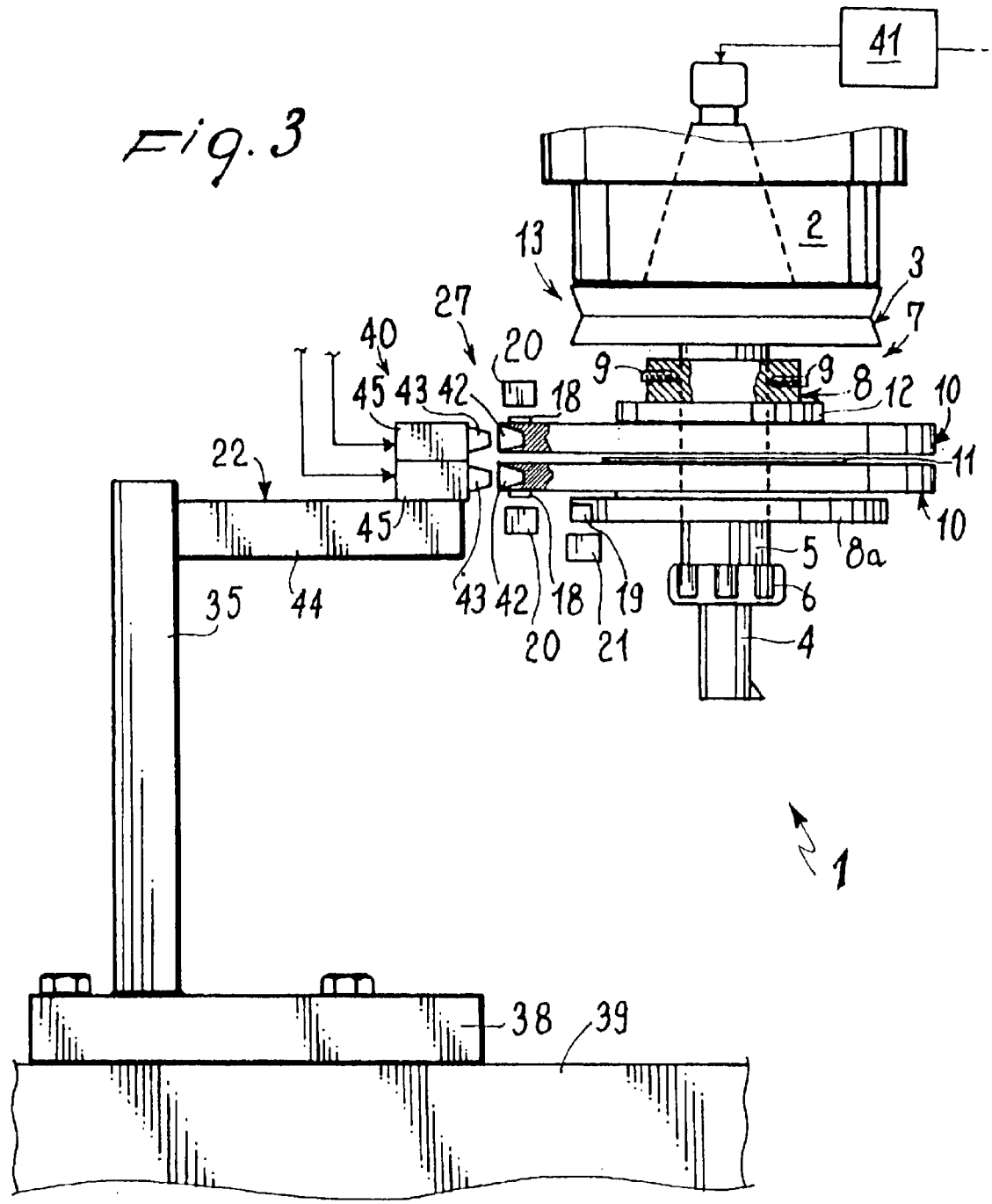
FIG. 3 is an elevation side view of another possible embodiment of an apparatus in accordance with the invention.

Cylinders 45 are operatively connected with the control and operation unit 24, as diagrammatically shown in FIG. 3, and are selectively activated by the latter so that the respective pistons are individually movable between a non operating position, in which they are disengaged from the respective rings 10, and an operating position, in which their free ends enter the respective notches 42 of rings. 10.

In this embodiment the driving means 41 may consist of the same motor usually driving spindle 2 in rotation, in particular a brushless type motor of an electric spindle, of which both the rotation speed and the angular position relative to an angular reference position can be checked, this data being transmitted to the control and operation unit 24 and being treated by the latter.

Also provided are the angular reference notches 18 and 19 on rings 10 and flange 8a, as well as sensors 20, 21, and 23 connected to unit 24 in the manner already described above.

The balancing operation in this embodiment is carried out in the following manner.

The control and operation unit 24 processes the sensor data and determines the unbalance and the correct relative angular position of rings 10 for obtaining the balance of the rotating body 13, as in the already described instance. Through a controlled activation of motor 41, unit 24 brings spindle 2 to such a position that notch 42 of the first one of rings 10 faces the respective locking element 43. Then rotation of spindle 2 is stopped and element 43 is activated so that the faced ring 10 is locked.

While the first ring 10 keeps at a standstill, unit 24 drives spindle 2 in angular rotation together with the tool-carrier 3 and hub 8, through motor 41, with a torque sufficient to overcome the friction force of the ring until such a ring is positioned in a relative angular position corresponding to that calculated for this ring based on the detected unbalance.

At this point the respective locking element 43 is disengaged from notch 42 and ring 10 is again free to rotate together with the rotating body 13.

Then the same operation is carried out for the second ring 10, that is brought to the angular position determined for such a ring.

The balancing operation is thus completed.

This embodiment not only allows the apparatus construction to be simplified, but also offers a substantially quicker balancing operation.

Figure 4:
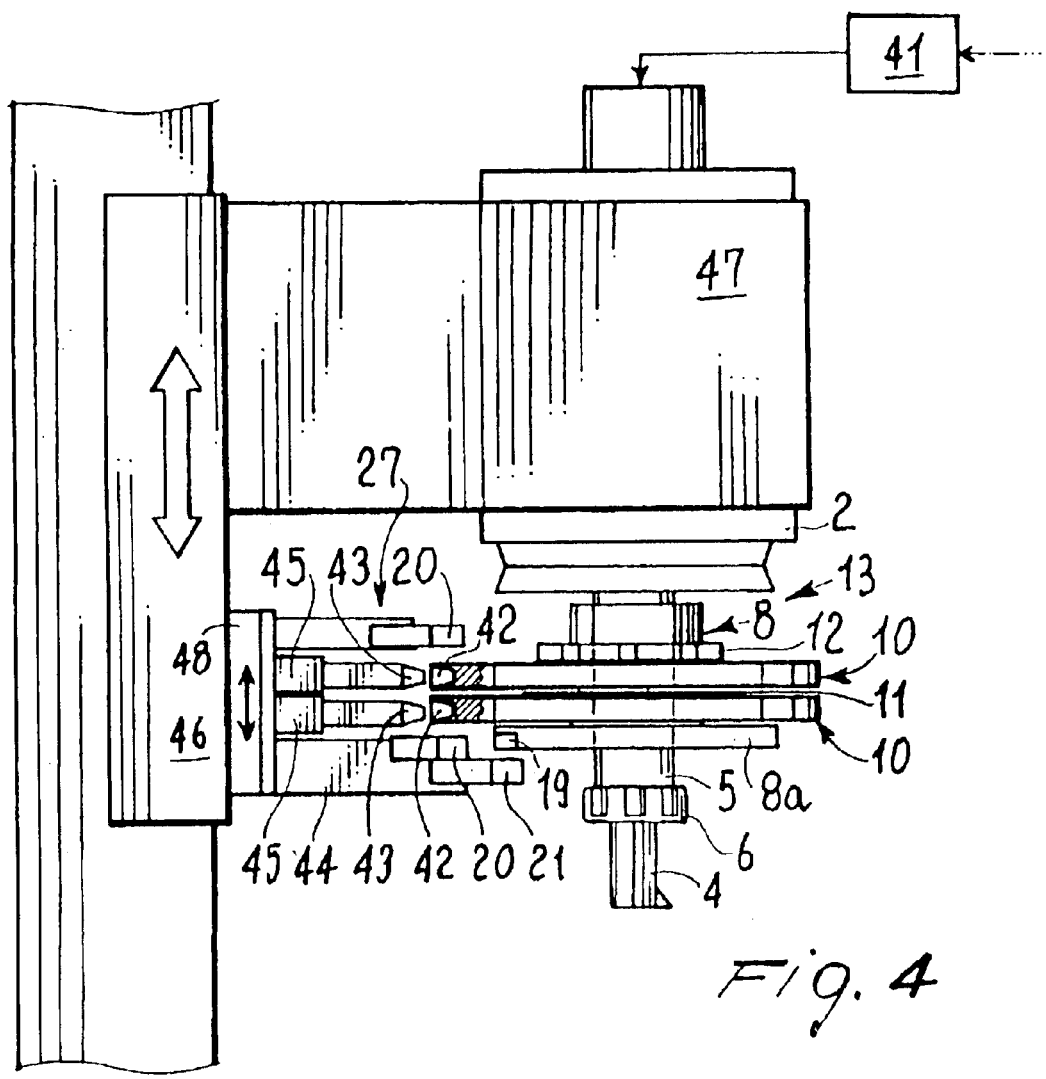
FIG. 4 is a further embodiment of the apparatus.

The embodiment shown in FIG. 4 differs from that in FIG. 3 due to the fact that the locking means 40 and sensors 20 and 21 are directly mounted on a slide 46 carrying the support 47 of the spindle 2. More specifically, they in turn can be disposed on a slide 48, a pneumatically operated slide for example, that is slidable parallel to slide 46.

Operation of the apparatus is the same, but in this embodiment it is possible to carry out the balancing cycle in the same position in which change of tool 4 takes place, because through slide 48 the locking means 40 and sensors 20 and 21 can be moved apart and the area can be made free during the tool-replacing step.

Figure 7:
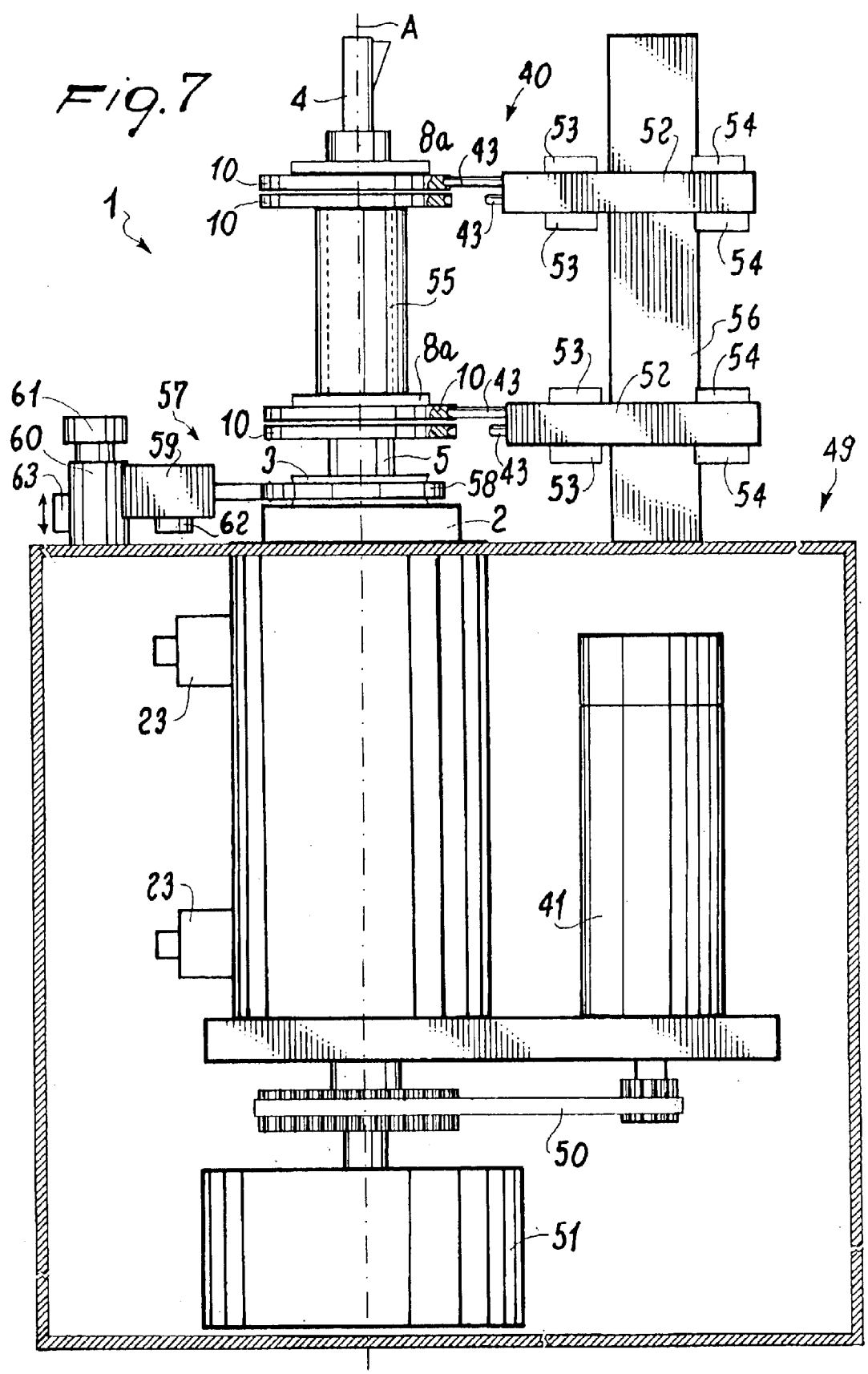
FIG. 7 shows an apparatus in accordance with the invention in an automatic balancing machine for tool-carriers, suitable for a two-plane balancing.

In FIG. 7 an apparatus 1 according to the invention is applied to a balancing machine, in particular an automatic balancing machine with a vertical axis for balancing tool-carriers having the tool assembled thereon, and adapted to carry out balancing in two planes.

Disposed within the machine 49 are the spindle 2 driven in rotation by motor 41 (a brushless motor) through a belt 50, as well as the unbalance transducers 23 suitably positioned for determining the unbalance in two planes, and a cylinder 51 for locking and unlocking the tool-carrier 3 relative to spindle 2, in known manner.

Mounted on the tool-carrier 3 are the balancing rings 10 in the already described manner. These rings are provided with notches 42 to be selectively engaged by the locking elements 43 of the locking means 40. Elements 43 are operated in the already described manner by respective pistons of pneumatic cylinders, arranged in a load bearing body 52. Limit sensors of known type are denoted at 53 and 54 and they are associated with the pistons and operatively connected with the control and operation unit 24.

Advantageously, two sets of rings 10 are provided that are disposed in pairs axially spaced apart on shaft 5 of the tool-carrier 3 and separated by a spacer 55. Rings 10 of each pair are mounted in the already described manner and friction is provided by the means already described in connection with FIGS. 1–4 and not shown in FIG. 7 for the sake of simplicity.

Likewise, two sets of locking means 40 with the respective pairs of locking elements 43 carried by respective load bearing bodies 52 are provided. They are supported by a column 56 fastened to the balancing machine with an axis parallel to axis A of the tool-carrier 3 and disposed alongside the latter. Advantageously, the load bearing bodies 52 can be fastened to different heights along column 56 so that balancing in two planes of tool-carriers 3 of different sizes can be carried out. In particular, bodies 52 could be each carried by a slide vertically movable on column 56. Column 56 could in turn be shiftable perpendicularly to the axis of the tool-carrier 3, so that the machine can be adapted to tool-carriers 3 and balancing rings 10 having different radial sizes. Shown in FIG. 7 is a device 57 with a locking clamp adapted to automatically enable a balancing of the so-called overturning type, in which in known manner unbalances of the rotating body are detected at two positions rotated through 180° with respect to each other, and the correction to be done for obtaining balance is the result of a vector calculation of the unbalance measurements detected in the two cases.

Device 57 comprises a pneumatic clamp 58 of known type, carried by a support body 59 rigidly fixed to a slide 60, vertically movable between two positions by a pneumatic cylinder 61. Associated with clamp 58 is a driving means not shown, disposed within body 59 for opening and closing the clamp on the tool-carrier 3. Denoted at 62 and 63 are respective sensors of known type adapted to signal the positions of open or closed clamp and raised or lowered clamp to the control and operation unit 24.

The balancing cycle that can be executed with the balancing machine shown in FIG. 7 comprises determination of the unbalance at two positions of the tool-carrier, rotated through 180°. For the purpose, after bringing the tool carrier 3 to the angular position of 0°, a first measurement of the tool-carrier unbalance with the tool mounted thereon is carried out.

Then spindle 2 is stopped, clamp 58 is closed on the tool-carrier 3 and the tool-carrier is released from the spindle through operation of cylinder 51 to the unlocked position.

At this point lifting of the clamp 58 and tool-carrier 3 relative to the spindle 2, for example by an amount of 10–15 cm, is operated through the cylinder 61 and the spindle 2, released from the tool-carrier 3, is rotated through 180° by the motor 41. Subsequently the clamp 58 is first lowered again, bringing the tool-carrier 3 back onto the spindle 2, and then opened, so that the tool-carrier is released to be then locked to the spindle again by activation of cylinder 51 to the locked position.

The sequential operation of the different elements can take place automatically upon command of the control and operation unit 24.

Then the second unbalance measurement is carried out.

Based on the two measurements carried out, the unbalance value in terms of amount and angular position is determined in known manner.

The correction cycle then involves the relative rotation of rings 10 relative to the tool-carrier 3, by acting on the balancing rings 10 and locking means 40 of each pair in the manner already described in connection with FIGS. 3 and 4, i.e. first on one pair and then on the other.

If the thus balanced tool carrier falls within the tolerance limits, it is released from the spindle, otherwise a second correction cycle as the just described one is carried out.

The whole balancing cycle can be executed automatically.

The invention achieves important advantages.

It embodies an automatic balancing apparatus in which the substantially high friction force of rings 10 avoids undesirable angular shiftings of same in a sure manner and therefore alterations in the balance state of the rotating body during the machine accelerations, decelerations and working operations. Thus a greater balancing stability is ensured.

In this connection it is to be noted that the invention substantially diverges from the known art in which balancing rings are proposed that are set on the rotating body with a necessarily low friction action, because otherwise the positioning means would not be able to angularly rotate the rings.

The apparatus in accordance with the invention also allows a ring positioning that is calculated and controlled in terms of infinitesimal amounts and therefore ensures a very fine adjustment of the rings and consequently a very accurate balancing.

The requirement of stopping the machine for carrying out balancing is therefore compensated for by a greater balancing capability generally avoiding further corrections.

In the apparatus in accordance with the invention bearings for supporting rings 10 are not necessary, which will bring about a reduction in bulkiness and costs. The apparatus is also capable of balancing rotating bodies having very high rotation speeds, in the order of 40,000–50,000 revolutions per minute for example, with the greatest accuracy.

In addition, due to the absence of magnets or magnetic elements the apparatus is able to operate without any problems even in the presence of liquids and/or chips or ferrous materials or other metal scraps.

Rings 10 can be contained in an axial space of very reduced size so that undesirable unbalancing torques are not created in the axial plane of the rotating bodies to be balanced.

The apparatus in accordance with the invention can be easily applied to existing machines, because only the balancing rings with the relevant friction means are required to be mounted on the rotating body whereas all other elements of the apparatus are located externally of the rotating body. Since electrical or electronic devices are not required to be mounted on the rotating body, the apparatus can be conveniently conceived for tool-carriers both of small and big sizes.

In addition it improves industrial applicability of the automatic balancing to work centers operating at high speed.

The invention is susceptible of many modifications and variations, in addition to those already described. Thus for example also in the case of application of the apparatus to work centers (FIGS. 1–4) more than two balancing rings 10 could be provided, two spaced pairs of adjacent rings to carry out a dynamic balancing in two planes, for example. Alternatively, the balancing machine in FIG. 7 could be provided with a single pair of balancing rings. The apparatus could be applied to machines with a horizontal instead of a vertical rotation axis. The positioning gear 29 could be disposed at a fixed level and spindle 2 could be axially shifted to the engagement positions of gear 29 with rings 10.

Provision could be made for two positioning gears 29, one for each ring 10, simultaneously engageable with rings 10 and drivable in rotation independently of each other for selective angular adjustment of rings 10.

Rings 10 could be each formed of a toothed pulley and the positioning means could consist of a toothed belt. Instead of two locking elements 43, a single locking element could be provided, mounted on a structure axially movable with respect to rings 10, and engageable each time with one of the rings. The rings could each have a series of circumferentially-distributed holes 16, only part of which housing each time the gauged masses 17, depending on the required balancing capability.

What is claimed is:

1. A balancing apparatus for rotating bodies, comprising:
   means for rotatably supporting a rotating body,
   at least two balancing rings disposed on said rotating body in axial side by side relationship with each other and coaxial with said rotating body, said rings being each unbalanced and rotatable with said rotating body and further susceptible of assuming different angular positions relative to said rotating body,
   detecting means for detecting unbalance of said rotating body and for detecting said angular positions of said rings relative to said rotating body, and positioning means operatively connected with, and responsive to, said detecting means for carrying out an angular rotation between said rings and said rotating body to bring said rings to a relative angular position corresponding to a balance state of said rotating body, wherein said positioning means comprises positioning members selectively engageable with said rings in a stopped position of said rotating body, and driving means for selectively causing a relative angular rotation of said rings and said rotating body during mutual engagement of said positioning members and said rings.

2. An apparatus as claimed in claim 1, further comprising friction means between said rings and said rotating body for preventing angular shiftings of said rings relative to said rotating body during disengagement of said rings from said positioning members.

3. An apparatus as claimed in claim 1, wherein said rings each have a driving toothing and wherein said positioning members comprise at least one positioning gear to be selectively and in succession engaged with said toothing of each of said rings, said driving means comprising a servomotor for setting said positioning gear in rotation when said positioning gear is in engagement with a respective one of said rings and said rotating body is in said stopped position.

4. An apparatus as claimed in claim 1, wherein said positioning members are carried by a support structure movable parallel to a rotation axis of said rotating body at least between a first and a second operating position, in which said positioning members are respectively engaged with a respective one of said rings.

5. An apparatus as claimed in claim 4, wherein said support structure comprises a slide slidably mounted on a support post fastened to a table of a machine tool.

6. An apparatus as claimed in claim 1, wherein said positioning members comprise means for locking said rings, and said driving means comprises a servomotor for angularly rotating said rotating body, said servomotor being actuatable when said locking means selectively engages said rings.

7. An apparatus as claimed in claim 6, wherein said rings have respective notches and said locking means comprises locking elements adapted to selectively penetrate in said notches of said rings.

8. An apparatus as claimed in claim 7, wherein said notches are formed in a circumferential surface of said rings and wherein said locking elements are radially and selectively movable relative to said rings between a non-operating position, in which said locking elements are disengaged from said notches, and an operating position, in which said locking elements are in engagement with said notches.

9. An apparatus as claimed in claim 6, wherein said rings are arranged on a shaft of a tool-carrier rotated by a spindle of a machine tool, and wherein said locking means is carried by a fixed structure of said machine tool.

10. An apparatus as claimed in claim 6, wherein said rings are arranged on a shaft of a tool-carrier rotated by a spindle of a machine tool, and wherein said locking means is disposed on a structure carried by a support of said spindle.

11. An apparatus as claimed in claim 10, wherein said locking means is disposed on a slide slidable parallel to a rotation axis of said spindle.

12. An apparatus as claimed in claim 6, wherein said rings are arranged on a shaft of a tool-carrier rotated by a spindle of a balancing machine, and wherein said locking means is carried by a fixed structure of said balancing machine.

13. An apparatus as claimed in claim 12, wherein said fixed structure extends parallel to a rotation axis of said spindle and wherein said locking means is supported slidably along said fixed structure.

14. An apparatus as claimed in claim 1, wherein said rings each have an unbalance milling.

15. An apparatus as claimed in claim 1, wherein said rings each have at least one hole and wherein a gauged mass of a material having a specific weight different from the specific weight of a material of said rings is arranged in said at least one hole.

16. An apparatus as claimed in claim 1, further comprising adjustable friction means between said rings and said rotating body for preventing angular shiftings of said rings relative to said rotating body during disengagement of said rings from said positioning members.

* * * * *